(12) United States Patent
Johnson

(10) Patent No.: US 8,249,052 B2
(45) Date of Patent: Aug. 21, 2012

(54) AUTOMATED ACCESS OF AN ENHANCED COMMAND SET

(75) Inventor: David Alan Johnson, Boise, ID (US)

(73) Assignee: CradlePoint, Inc., Boise, ID (US)

( * ) Notice: Subject to any disclaimer, the term of this patent is extended or adjusted under 35 U.S.C. 154(b) by 897 days.

(21) Appl. No.: 12/350,464

(22) Filed: Jan. 8, 2009

(65) Prior Publication Data

US 2009/0182845 A1    Jul. 16, 2009

Related U.S. Application Data

(63) Continuation-in-part of application No. 10/936,124, filed on Sep. 8, 2004, now Pat. No. 7,764,784.

(60) Provisional application No. 61/019,881, filed on Jan. 9, 2008.

(51) Int. Cl.
*H04L 12/28*    (2006.01)

(52) U.S. Cl. ........ 370/351; 370/252; 709/219; 709/221; 709/238

(58) Field of Classification Search .................. 370/351, 370/252; 709/219, 221, 238
See application file for complete search history.

(56) References Cited

U.S. PATENT DOCUMENTS

| | | | |
|---|---|---|---|
| 5,594,946 A | 1/1997 | Menich et al. | |
| 5,859,628 A | 1/1999 | Ross et al. | |
| 5,864,539 A | 1/1999 | Yin | |
| 6,006,264 A | 12/1999 | Colby et al. | |
| 6,028,848 A | 2/2000 | Bhatia et al. | |
| 6,031,844 A | 2/2000 | Lin | |
| 6,377,825 B1 | 4/2002 | Kennedy et al. | |
| 6,389,462 B1 | 5/2002 | Cohen et al. | |
| 6,434,187 B1 | 8/2002 | Beard et al. | |
| 6,535,592 B1 | 3/2003 | Snelgrove | |
| 6,560,442 B1 | 5/2003 | Yost et al. | |
| 6,609,197 B1 | 8/2003 | Ketcham et al. | |
| 6,611,861 B1 | 8/2003 | Schairer et al. | |
| 6,615,262 B2 | 9/2003 | Schweitzer et al. | |
| 6,735,447 B1 | 5/2004 | Muller | |
| 6,795,700 B2 | 9/2004 | Karaoguz et al. | |
| 6,850,495 B1 | 2/2005 | Baum et al. | |
| 6,862,444 B2 | 3/2005 | Karaoguz et al. | |
| 6,885,859 B2 | 4/2005 | Karaoguz et al. | |
| 6,967,958 B2 | 11/2005 | Ono et al. | |

(Continued)

FOREIGN PATENT DOCUMENTS

JP    20010186565    7/2001

(Continued)

OTHER PUBLICATIONS

USPTO, "Office Action in U.S. Appl. No. 11/673,956 dated Dec. 22, 2010".

(Continued)

*Primary Examiner* — Albert T Chou
(74) *Attorney, Agent, or Firm* — Parsons Behle & Latimer

(57) ABSTRACT

A method for accessing an enhanced command set includes utilizing a generic command set to obtain identifying data from a data exchanger in communication with a router device. The generic command set is utilized to cause the data exchanger to establish a remote link between with a data service provider. A remote enhanced command set associated with the identifying data is obtained via the established remote link. The obtained enhanced command set is utilized to access a feature of the data exchanger not available utilizing the generic command set.

20 Claims, 5 Drawing Sheets

U.S. PATENT DOCUMENTS

| | | |
|---|---|---|
| 6,987,726 B1 | 1/2006 | Elliott |
| 7,009,941 B1 | 3/2006 | Uchino |
| 7,095,335 B2 | 8/2006 | De Bolster et al. |
| 7,187,923 B2 | 3/2007 | Mousseau et al. |
| 7,213,478 B2 | 5/2007 | Harada et al. |
| 7,317,896 B1 | 1/2008 | Saxena et al. |
| 7,346,344 B2 | 3/2008 | Fontaine |
| 7,382,771 B2 | 6/2008 | Leblanc et al. |
| 7,400,903 B2 | 7/2008 | Shoemake et al. |
| 7,421,265 B1 | 9/2008 | Liu |
| 7,617,317 B2 | 11/2009 | Jones et al. |
| 7,620,065 B2 | 11/2009 | Falardeau |
| 7,675,862 B2 | 3/2010 | Pham et al. |
| 7,764,784 B2 | 7/2010 | Sewall |
| 2001/0039580 A1 | 11/2001 | Walker et al. |
| 2001/0042215 A1 | 11/2001 | Sullivan et al. |
| 2001/0046870 A1 | 11/2001 | Stilp et al. |
| 2002/0025832 A1 | 2/2002 | Durian et al. |
| 2002/0062372 A1 | 5/2002 | Hong et al. |
| 2002/0118663 A1 | 8/2002 | Dorenbosch et al. |
| 2003/0037165 A1 | 2/2003 | Shinomiya |
| 2003/0043755 A1 | 3/2003 | Mitchel |
| 2003/0045295 A1 | 3/2003 | Stanforth |
| 2003/0046396 A1 | 3/2003 | Richter et al. |
| 2003/0059005 A1 | 3/2003 | Meyerson et al. |
| 2003/0126252 A1 | 7/2003 | Abir |
| 2003/0200308 A1 | 10/2003 | Tameda et al. |
| 2003/0212800 A1* | 11/2003 | Jones et al. ................... 709/228 |
| 2003/0235175 A1 | 12/2003 | Naghian et al. |
| 2004/0003071 A1 | 1/2004 | Mathew et al. |
| 2004/0038697 A1 | 2/2004 | Attar et al. |
| 2004/0049576 A1 | 3/2004 | Schweitzer et al. |
| 2004/0110544 A1 | 6/2004 | Oyagi et al. |
| 2004/0133689 A1 | 7/2004 | Vasisht |
| 2004/0133793 A1 | 7/2004 | Ginter et al. |
| 2004/0139170 A1 | 7/2004 | Shen et al. |
| 2004/0152449 A1 | 8/2004 | Koshihara |
| 2004/0153676 A1 | 8/2004 | Krantz et al. |
| 2004/0185876 A1 | 9/2004 | Gorenendaal et al. |
| 2004/0205154 A1 | 10/2004 | Dalton et al. |
| 2004/0205155 A1 | 10/2004 | Nobakht et al. |
| 2004/0218544 A1 | 11/2004 | Lee |
| 2004/0250136 A1 | 12/2004 | Trappeniers et al. |
| 2005/0008017 A1* | 1/2005 | Datta et al. ................... 370/392 |
| 2005/0014525 A1 | 1/2005 | Tsunehara et al. |
| 2005/0022013 A1 | 1/2005 | Schwenk |
| 2005/0038905 A1 | 2/2005 | Banes et al. |
| 2005/0101340 A1 | 5/2005 | Archiable |
| 2005/0108573 A1 | 5/2005 | Bennett et al. |
| 2005/0198234 A1* | 9/2005 | Leib et al. ................... 709/221 |
| 2005/0198319 A1 | 9/2005 | Chan et al. |
| 2005/0221850 A1 | 10/2005 | Kashiwase |
| 2005/0233728 A1 | 10/2005 | Karaoguz et al. |
| 2005/0245233 A1 | 11/2005 | Anderson |
| 2005/0246434 A1 | 11/2005 | Bantz et al. |
| 2005/0259645 A1 | 11/2005 | Chen et al. |
| 2005/0259654 A1 | 11/2005 | Faulk, Jr. |
| 2005/0262248 A1 | 11/2005 | Jennings, III et al. |
| 2005/0267965 A1 | 12/2005 | Heller |
| 2006/0047823 A1 | 3/2006 | Cheng |
| 2006/0072474 A1 | 4/2006 | Mitchell |
| 2006/0077607 A1 | 4/2006 | Henricks et al. |
| 2006/0133582 A1 | 6/2006 | McCulloch |
| 2006/0153216 A1 | 7/2006 | Hosein et al. |
| 2006/0171402 A1 | 8/2006 | Moore et al. |
| 2006/0184670 A1 | 8/2006 | Beeson et al. |
| 2006/0187890 A1 | 8/2006 | Lin |
| 2007/0002846 A1 | 1/2007 | Rada et al. |
| 2007/0030857 A1 | 2/2007 | Fulknier et al. |
| 2007/0081469 A1 | 4/2007 | Tracy et al. |
| 2007/0083606 A1 | 4/2007 | Malik et al. |
| 2007/0147324 A1 | 6/2007 | McGary |
| 2007/0153689 A1 | 7/2007 | Strub et al. |
| 2007/0254727 A1 | 11/2007 | Sewall et al. |
| 2007/0255848 A1 | 11/2007 | Sewall et al. |
| 2007/0291711 A1 | 12/2007 | Welch et al. |
| 2008/0005108 A1 | 1/2008 | Ozzie et al. |
| 2008/0008165 A1 | 1/2008 | Ikeda et al. |
| 2008/0039102 A1 | 2/2008 | Sewall et al. |
| 2008/0043626 A1 | 2/2008 | Pham et al. |
| 2008/0043673 A1 | 2/2008 | Johnson et al. |
| 2008/0046561 A1 | 2/2008 | Pham et al. |
| 2008/0049630 A1 | 2/2008 | Kozisek et al. |
| 2008/0056222 A1 | 3/2008 | Waites |
| 2008/0117860 A1 | 5/2008 | Rodriguez et al. |
| 2008/0159167 A1 | 7/2008 | Ito et al. |
| 2008/0178172 A1* | 7/2008 | Dossa et al. ................... 717/174 |
| 2008/0259841 A1 | 10/2008 | Deshpande |
| 2008/0310407 A1 | 12/2008 | Sewall et al. |
| 2008/0313327 A1 | 12/2008 | Sewall et al. |
| 2009/0015419 A1 | 1/2009 | Sewall et al. |
| 2009/0129319 A1 | 5/2009 | Buddhikot et al. |
| 2009/0138447 A1 | 5/2009 | Kalavade |
| 2009/0147700 A1 | 6/2009 | Sewall et al. |
| 2009/0168789 A1 | 7/2009 | Wood et al. |
| 2009/0172658 A1 | 7/2009 | Wood et al. |
| 2009/0172796 A1 | 7/2009 | Wood et al. |
| 2009/0175285 A1 | 7/2009 | Wood et al. |
| 2009/0180395 A1 | 7/2009 | Wood et al. |
| 2010/0014415 A1 | 1/2010 | Moeller |
| 2010/0118846 A1 | 5/2010 | Moeller |
| 2010/0202450 A1* | 8/2010 | Ansari et al. ................... 370/389 |
| 2011/0051703 A1 | 3/2011 | Fulknier et al. |
| 2011/0167157 A1* | 7/2011 | Virgilio et al. ................ 709/225 |
| 2011/0199932 A1* | 8/2011 | Short et al. ..................... 370/252 |

FOREIGN PATENT DOCUMENTS

| | | |
|---|---|---|
| KR | 20040028099 | 4/2004 |

OTHER PUBLICATIONS

USPTO, "Final Office Action in U.S. Appl. No. 12/172,885 dated Nov. 2, 2010".

In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.

Mikrotik, "MikroTik Router OS V28 Reference Manual", 2005.

Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758, Dec. 1997.

USPTO, "Office Action in U.S. Appl. No. 12/270,419 dated Dec. 17, 2010".

USPTO, "Final Office Action in U.S. Appl. No. 12/350,407 dated Dec. 14, 2010".

US Patent and Trademark Office, Office Action, U.S. Appl. No. 12/172,862, dated Jul. 27, 2011.

US Patent and Trademark Office, Final Office Action, U.S. Appl. No. 11/673,965, dated Aug. 4, 2011.

US Patent and Trademark Office, Office Action, U.S. Appl. No. 11/673,956, dated Aug. 10, 2011.

US Patent and Trademark Office, Office Action, U.S. Appl. No. 12/350,407, dated Jul. 6, 2011.

US Patent and Trademark Office, Final Office Action, U.S. Appl. No. 12/270,419, dated Jul. 11, 2011.

USPTO, "Office Action in U.S. Appl. No. 11/673,973", Jun. 24, 2010.

USPTO, "Office Action in U.S. Appl. No. 12/172,862", Aug. 31, 2010.

USPTO, "Final Office Action in U.S. Appl. No. 10/936,124.", Feb. 2, 2007.

USPTO, "Final Office Action in U.S. Appl. No. 10/936,124.", Feb. 9, 2009.

USPTO, "Final Office Action in U.S. Appl. No. 10/936,124.", Jul. 11, 2007.

USPTO, "Final Office Action in U.S. Appl. No. 10/936,124.", Sep. 3, 2009.

USPTO, "Office Action in U.S. Appl. No. 10/936,124.", Apr. 10, 2008.

USPTO, "Office Action in U.S. Appl. No. 10/936,124.", Jun. 26, 2006.

Webster's, "Router", Aug. 28, 2009, Publisher: Webster's New World Telcom Dictionary 2009, Your Dictionary, www.yourdictionary.com/telecom/router.

USPTO, "Final Office Action in U.S. Appl. No. 11/673,965.", Apr. 1, 2010.

USPTO, "Office Action in U.S. Appl. No. 11/673,965.", Sep. 2, 2009.

USPTO, "Advisory Action in U.S. Appl. No. 11/376,973", Mar. 19, 2010.

R. Elz, R. R Bush, "RFC 2181 Clarifications to the DNS Specification, Internet Engineering Task Force, http://tools.ietf.org/html/rfc2181, 1 page", Jul. 1997.

P. Vixie, S. Thomson, Y. Rekhter, J. Bound, "RFC 2136 Dynamic Updates in the Domain Name System (DNS Update), Internet Engineering Task Force, 51 pages.", Apr. 1997.

USPTO, "Final Office Action in U.S. Appl. No. 11/673,973.", Dec. 10, 2009.

USPTO, "Office Action in U.S. Appl. No. 11/673,973.", May 28, 2009.

Wikipedia, "Proxy Server, http://en.wikipedia.org/wiki/Proxy_server ; 9 pages,", Apr. 12, 2010.

USPTO, "Final Office Action in U.S. Appl. No. 11/673,956.", Apr. 15, 2010.

USPTO, "Office Action in U.S. Appl. No. 11/673,956.", Sep. 2, 2009.

USPTO, "Office Action in U.S. Appl. No. 12/172,885.", Apr. 26, 2010.

USPTO, "Office Action in U.S. Appl. No. 12/350,407.", Apr. 5, 2010.

PCT, "International Search Report & Written Opinion of the International Searching Authority for Application No. PCT/US2007/062077,", Nov. 20, 2007.

PCT, "International Search Report & Written Opinion of the International Searching Authority for Application No. PCT/US2007/062078,", Mar. 5, 2008.

PCT, "International Search Report & Written Opinion of the International Searching Authority for Application No. PCT/US2007/062079,", Nov. 8, 2007.

PCT, "International Search Report and Written Opinion of the International Searching Authority for Application No. PCT/US2008/076836,", Mar. 6, 2009.

PCT, "International Search Report and Written Opinion of the International Searching Authority for Application No. PCT/US2008/083409,", May 12, 2009.

USPTO, "Office Action in U.S. Appl. No. 11/673,965 dated Feb. 15, 2011".

USPTO, "Office Action in U.S. Appl. No. 12/172,862 dated Feb. 14, 2011".

\* cited by examiner

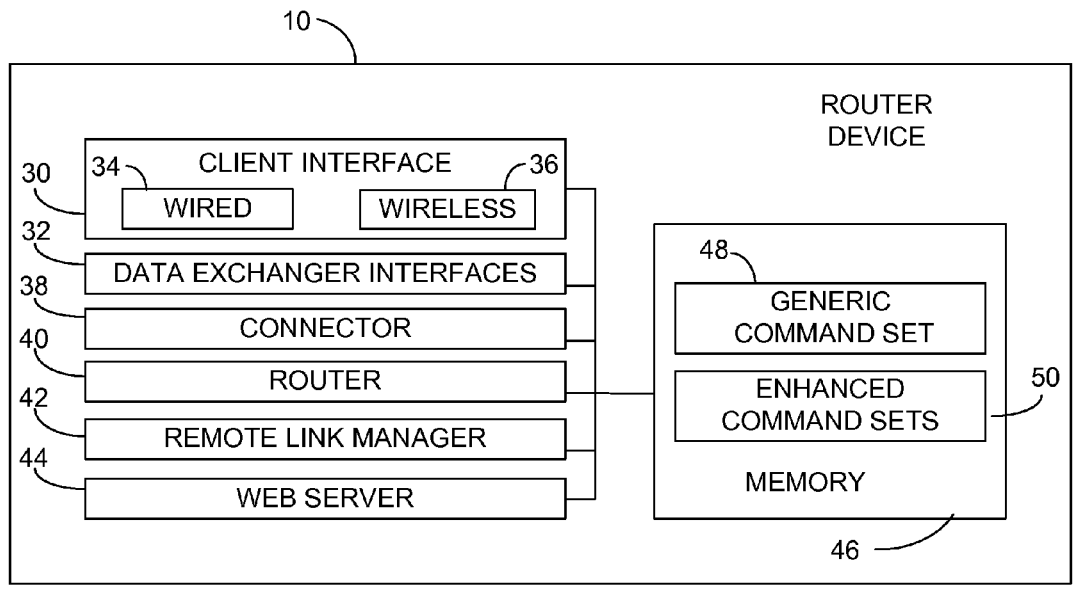
FIG. 2
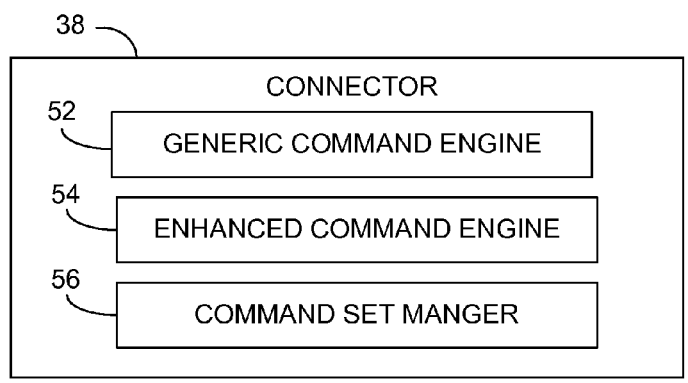
FIG. 3
FIG. 4

AUTOMATED ACCESS OF AN ENHANCED COMMAND SET

CROSS REFERENCE TO RELATED APPLICATIONS

This application claims the priority of provisional applications 61/019,881 entitled "Automated Installation of Optimized Router Command Set" filed Jan. 9, 2008 which is hereby incorporated by reference. This application is a continuation in part of application Ser. No. 10/936,124 entitled Device Cradle filed Sep. 8, 2004 now U.S. Pat. No. 7,764,784. Application Ser. No. 10/936,124 is incorporated herein by reference.

BACKGROUND

Routers allow client devices in a local area network (LAN) to access a wide area network (WAN). Often, a router connects to the WAN via a data exchanger such as a data enabled cellular device, a DSL modem, or a cable modem. A given router may be equipped to simultaneously connect to multiple data exchangers. Each data exchanger is equipped to establish a data link with one or more service providers over which the router device can route data communications. The router device when manufactured can be programmed with the individualized command sets for any number of data exchangers available at the time. The router device can use the command sets to interact with various data exchangers. However, as new data exchangers are developed and existing data exchangers receive firmware upgrades, the router device needs access to new command sets.

DESCRIPTION OF THE DRAWINGS

FIGS. 2-5 are block diagrams showing physical and logical components of a router device according to an embodiment of the present invention.

DETAILED DESCRIPTION

Introduction:

Various embodiments described below operate to automatically obtain an enhanced command set for a data exchanger being utilized by a router device to access a wide area network (WAN). The router device is preprogrammed with a generic command set it can use to communicate with a number of a data exchangers. The router device utilizes the generic command set to obtain identifying data from a particular data exchanger it wishes to utilize. That identifying data may include a model number and a firmware version for the data exchanger. The router device then uses the generic command set to cause the data exchanger to establish a remote link with a data service provider. Supplying the identifying data, the router device communicates via that remote link with a service that can supply an enhanced command set for the data exchanger. The service then returns an enhanced command set associated with the identifying data to the router device. The router device can then use the enhanced command set to access additional features of the data exchanger.

Figure 1:
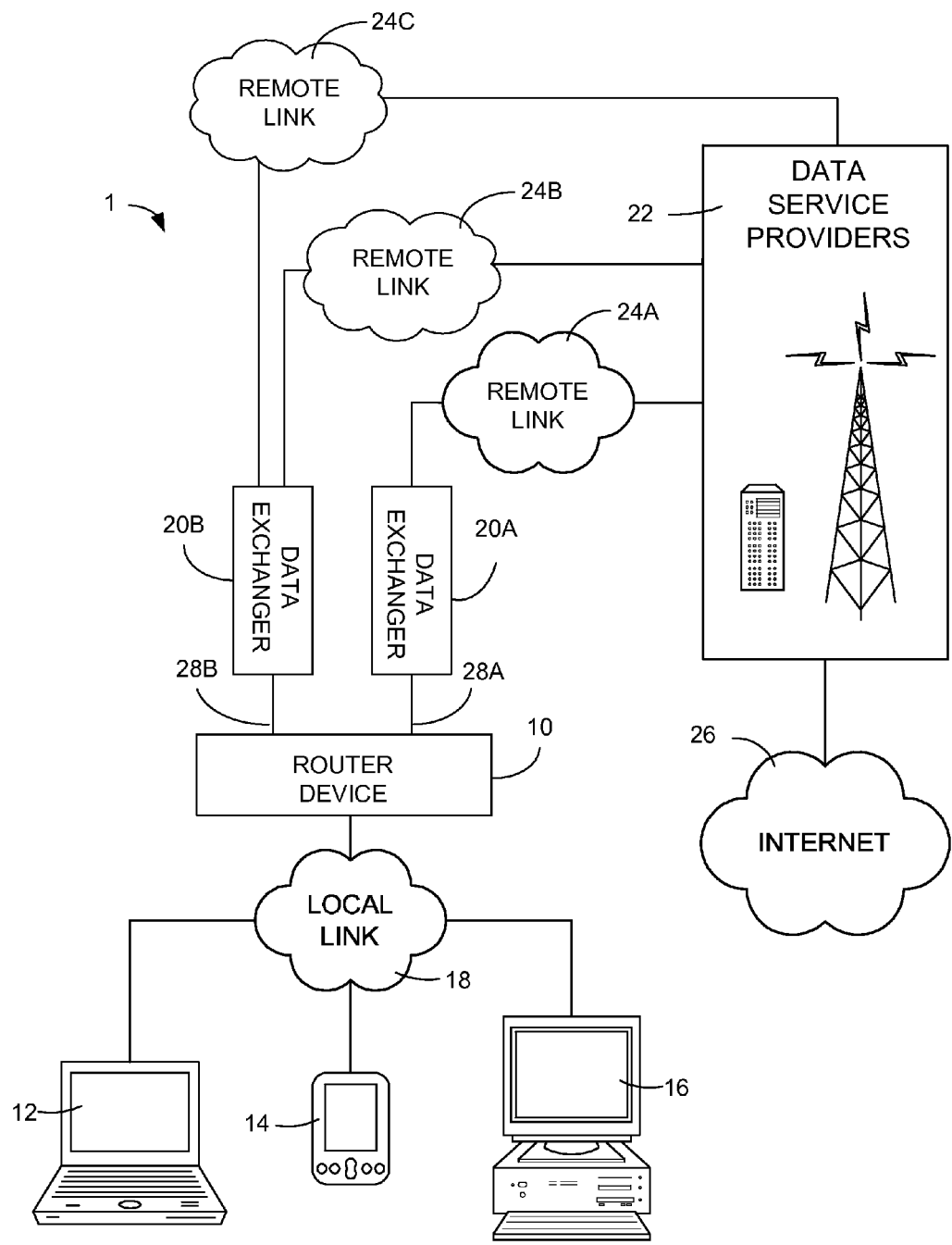
FIG. 1 illustrates an exemplary environment in which embodiments of the present invention can be implemented.

Environment:

FIG. 1 illustrates exemplary environment 1 in which various embodiments of the present invention may be implemented. Environment 1 includes router device 10 and clients 12, 14, and 16 and local link 18. Clients 12, 14, and 16 represent generally any computing devices capable of communicating with router device 10. Router device 10, discussed in more detail later, represents generally a device capable of connecting to clients 12, 14, and 16 and performing one or more tasks as guided by a connected client.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchangers 20A, 20B and service providers 22. Each data exchanger 20A, 20B represents generally any combination of hardware and programming that can be utilized by router device 10 to connect to a wide area network (WAN) such as the internet. A given data exchanger 20A, 20B may, for example, take the form of a data capable cellular device such as a cell phone or card adapter, a DSL modem, a cable modem, or even a dial-up modem.

Service providers 22 represent generally infrastructure configured to provide internet related data services to subscribers such as an owner of data exchangers 20A, 20B. For example, where a given data exchanger 20A, 20B is a data enabled cellular telephone or card adapter, a corresponding service providers 22 may be a cellular telephone service provider capable of providing voice and data services to subscribers allowing access to internet 26. Where a given data exchanger 22A, 22B is a DSL or cable modem, a corresponding service providers 22 may include a more traditional internet service provider (ISP) providing data access to internet 26.

Remote links 24A, 24B, 24C are each a data link that interconnects a given data exchanger 20A, 20B and service provider 22. Each remote link 24A, 24B, 24C represents generally any combination of a cable, wireless, or remote connection via a telecommunication link, an infrared link, a radio frequency link, or any other connectors or systems that provides electronic communication between data exchanger 20 and service providers 22.

In the embodiment illustrated in environment 1, device links 28A, 28B interconnect router device 10 and data exchangers 20A, 20B. Each device link 28A, 28B represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying communications of any one of a number of protocols such as Bluetooth.

It is noted that one or both data exchangers 20A, 20B may be fully integrated into router device 10 or may be cards, dongles, or the like that plug into router device 10. Thus one or both device links 28A, 28B may include internal connections within router device 10. While FIG. 1 illustrates the existence of two data exchangers 20A, 20B, router device 10 may be configured to utilize any number of data exchangers.

Router Device:

FIG. 2 is a block diagram illustrating physical and logical components of router device 10. In this example, router device 10 represents generally any combination of hardware and programming capable routing network communications between clients on the local network and between the clients and a wide area network such as the internet via a selected one of a plurality of data exchangers. In the example of FIG. 3 router device 10 includes client interface 30 and data exchanger interfaces 32. Client interface 30 represents generally any combination of hardware and program instructions capable of supplying a communication interface between router device 10 and clients 12, 14, and 16 shown in FIG. 1. Data exchanger interfaces 32 each represent any combination of hardware and programming enabling data to be communicated between router device 10 and a data exchanger such as data exchanger 20A or 20B in FIG. 1.

Client interface 30 is shown to include wired interface 34 and wireless interface 36. Wired interface 34 represents generally any interface through which communications can pass between router device 10 and clients 12, 14, and 16 via one or more physical wires. Wired interface 34 may include one or more serial or parallel ports including but not limited to USB and FireWire ports. Wireless interface 36 represents generally any interface through which information can be exchanged between router device 10 and clients 12, 14, and 16 via a wireless protocol such as ultrawideband (UWB), Bluetooth, or 802.11.

Router device 10 also includes connector 38, router 40, remote link manager 42, web server 44, and memory 46. Connector 38, discussed in more detail with respect to FIG. 3 below, represents generally any combination of hardware and programming configured to send commands for controlling data exchangers of various types. In the example of FIG. 1, router device 10 utilizes data exchangers 20A and 20B. Data exchangers 20A and 20B may be from different manufactures and may be designed to interact with different data service providers. Thus, connector 38 utilizes different commands for each data exchanger 20A and 20B to achieve the same result. Connector 38 is responsible sending appropriate commands to cause a selected data exchanger to perform a particular task. Such tasks can include establishing a remote link with a data service provider so that access can be made to a wide area network such as internet 26. Other tasks include sending signals to poll a data exchanger for link status information identifying a state of the remote link between the data exchanger and a wide area network.

Where the remote link between a given data exchanger and a corresponding data service provider is wireless, the link status information can identify a signal strength of the remote link and a data transfer rate of the remote link. For a data enabled cellular device, the signal strength is a function of the proximity of the data exchanger and a cell tower or other transceiver with which the data exchanger communicates. Improved signal strength can allow for improved data transfer rates.

Router 40 represents generally any combination of hardware and programming for routing network communication received through client interface 30 to be transmitted by a selected data exchanger to a wide area network such as internet 26. Router 40 is also responsible for routing inbound network communications received from a wide area network and directed via client interface 30 to a specified client 12, 14, or 16. Outbound and inbound network communications, for example can be an IP (internet Protocol) packets directed to a target on a wide area network or to a particular network device 12, 14, or 16 on a local area network.

Remote link manager 42 represents generally any combination of hardware and programming capable of automatically selecting one of a plurality of available data paths over which a router 40 routs data communications to a wide area network. An available data path, as used herein, represents a possible communication path between a data exchanger and a data service provider for that data exchanger. In other words, an available data path represents an existing or possible remote link between a data exchanger and a corresponding data service provider. Remote link manager 42 is responsible for causing connector 38 to supply the necessary commands to the appropriate data exchanger so that router 40 is allowed to route data communications. Those commands cause the data exchanger to establish a remote link that follows the selected data path. In the example of FIG. 1, router device 10 has three available data paths for routing data communications to a wide area network. Remote link 24C follows one available data path, remote link 24B follows a second, and remote link 24A follows a third.

Remote link manager 42 is also responsible for utilizing connector 38 to access other features of various data exchangers. Such interactions can involve querying the data exchangers for information such as signal strength and transfer speeds. Other interactions can cause a given data exchanger to obtain and install a firmware upgrade. A given data exchanger may have any number of features that can be accessed or otherwise manipulated by utilizing connecter 38

Web server 44 represents generally any combination of hardware and programming capable of serving interfaces such as web pages to clients 12, 14, and 16. Such web pages may include web pages that when displayed by a network device allows a user to provide or otherwise select settings related to the operation of router device 10 including features supplied by data exchangers.

Memory 46 represents generally one or more computer readable mediums capable of storing data that is accessible to connector 38. While memory 46 is shown as being integral to router device 10, memory 46 may be located elsewhere such that it is accessible to connector 38 without establishing a remote link to a data service provider. For example, memory 46 may be located on a client device accessible to connector 38 via client interface 30. In another example, memory may be located on a drive coupled to router device 10 via an interface not shown in FIG. 2.

As shown memory 46 includes generic command set 48 and enhanced command sets 50. Generic command set 48 represents generally a set of commands that can be utilized by connector 38 to interact with a variety of different types of data exchangers. For example, connector 38 can use the same generic command selected from set 48 to interact with any one of a given set of data exchangers to obtain identifying data for that data exchanger. Such identifying data may include a model number and perhaps a firmware version. Connector 38 may utilize another generic command from set 48 to cause any one of that set of data exchangers to establish a remote link with a corresponding data service provider. Enhanced command sets 50 represent a collection of command sets where each set includes various commands selected for a particular data exchanger. In a given example, connector 38 may utilize a command from a particular one of enhanced command sets 50 to interact with a particular data exchanger model. That command however, need not be compatible with other data exchanger models.

It is noted that memory 46, whether integrated in or otherwise accessible to router device 10, can be accessed by connector 38 without the need for establishing a remote link to a data service provider. In this sense, memory 46 is "local" to router device 10. Thus, each enhanced command set 50 stored in memory 46 can be referred to as a local enhanced command set. As will be discussed below, memory 46 may not contain an enhanced command set 50 that is compatible with a data exchanger coupled to one of data exchanger interfaces 32. In such a case, connector 38 obtains an enhanced command set via an established remote link from a command set provider. This provider may be the data service provider or a source found on the internet. Because it is obtained via a remote link, such an enhanced command set is can be referred to as a remote enhanced command set. A remote enhanced command set, once obtained, can be stored in memory 46 at which time it becomes a local enhanced command set.

FIG. 3 is a block diagram illustrating physical and logical components of connector 38. In this example, connector 38 is shown to include generic command engine 52, enhanced command engine 54, and command set manager 56. Generic command engine 52 represents generally any combination of hardware and programming capable of utilizing commands from generic command set 48 to interact with any data exchanger in communication with router device 10. Enhanced command engine 52 represents generally any combination of hardware and programming capable of utilizing commands from a selected one of enhanced command sets 50 to interact with a selected data exchanger in communication with router device 10. Command set manager 56 represents generally any combination of hardware and programming capable determining if memory 46 includes a local enhanced command associated with identifying data obtained from a data exchanger and, if so, obtaining that local enhanced command set from memory 46. If not, command set manager 56 is capable of communicating over a remote link established by that data exchanger to obtain a remote enhanced command set associated with that identifying data. Command set manager 56 is also responsible for updating memory 46 with obtained remote enhanced command sets.

Thus in a given implementation, generic command engine 52 can use commands from generic command set to obtain identifying data from a particular data exchanger and cause that data exchanger to establish a remote link with a data service provider. Using the identifying data, command set manager 56 communicates via the remote link with a command set service to obtain an enhanced command set associated with the identifying data. Command set manager 60 can update enhanced command sets 50 with the obtained command set allowing enhanced command manager 54 to utilize commands from that command set to further interact with the data exchanger. Such further interactions can be useful to access more advanced features of the data exchanger.

FIG. 4 is a block diagram depicting an exemplary implementation of generic command set 48. In this example, generic command set 48 takes the form of a database of entries 58. Each entry 58 corresponds to a generic command that can be used to interact with any number of different data exchanger models. Each entry 58 includes data in a number of fields 60-62. Command ID field 60 of a given entry 58 contains data identifying a particular generic command. Command string field 62 of each entry 58 contains the actual command string that can be sent to a data exchanger to achieve a desired response. A given command string from an entry 58 may cause a data exchanger to return identifying data or to establish a remote link.

Figure 5:
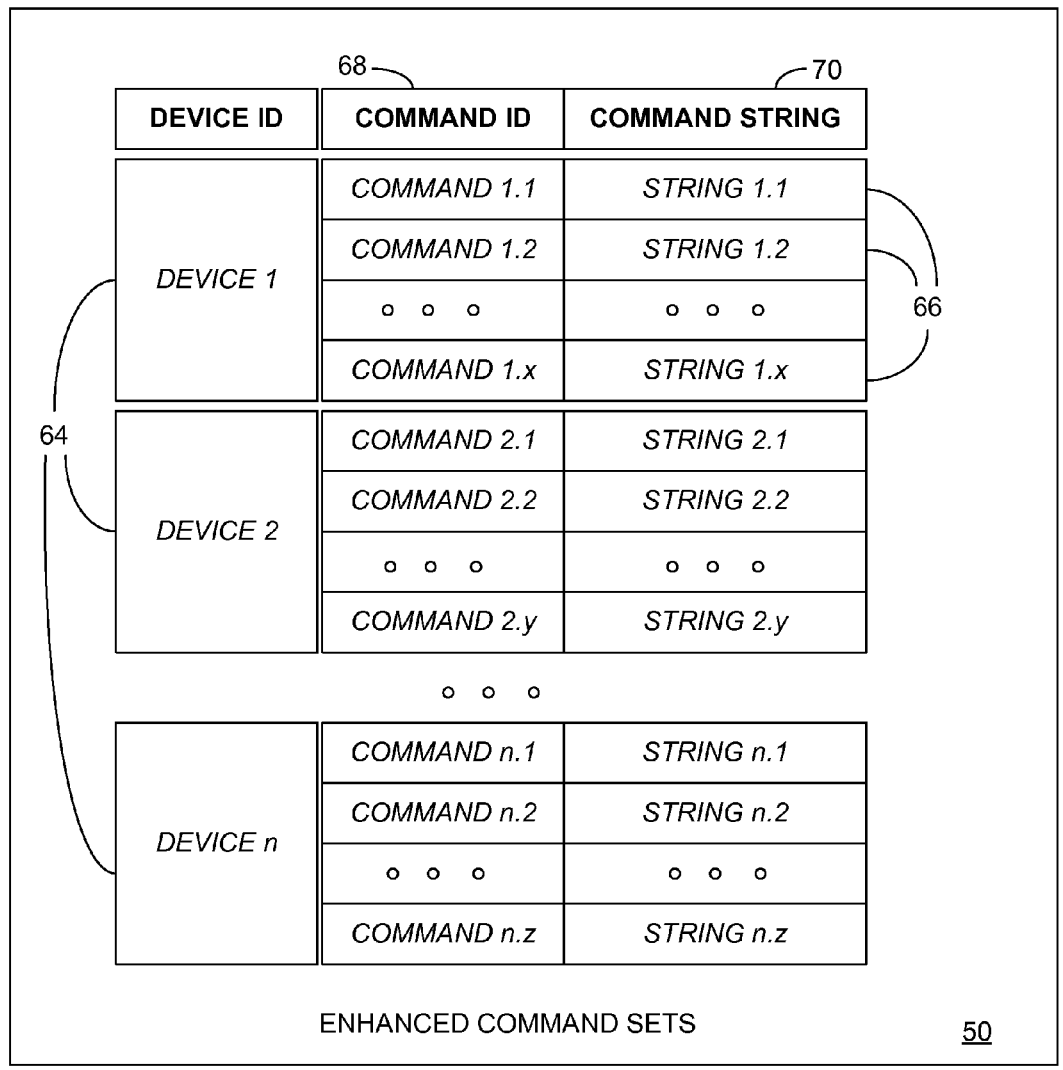

FIG. 5 is a block diagram depicting an exemplary implementation of enhanced command sets 50. As depicted enhanced command sets 50 include a series of individual command sets 64 each corresponding to a particular data exchanger model. Each individual command set 64 includes a series of entries 66. Each entry 58 corresponds to a command that can be used to interact with a particular data exchanger model. Each entry 66 includes data in fields 68-70. Command ID field 68 of a given entry 66 contains data identifying a command for a particular data exchanger model. That data exchanger model corresponds or is otherwise associated with the given individual command set 64 containing that entry 66. Command string field 70 of each entry 66 contains the actual command string that can be sent to that particular data exchanger model to achieve a desired response. In one implementation, a given command string from an entry 66 may cause a data exchanger to return information identifying a signal strength or a transfer rate. Another command may cause that data exchanger to obtain and install a firmware upgrade.

Figure 6:
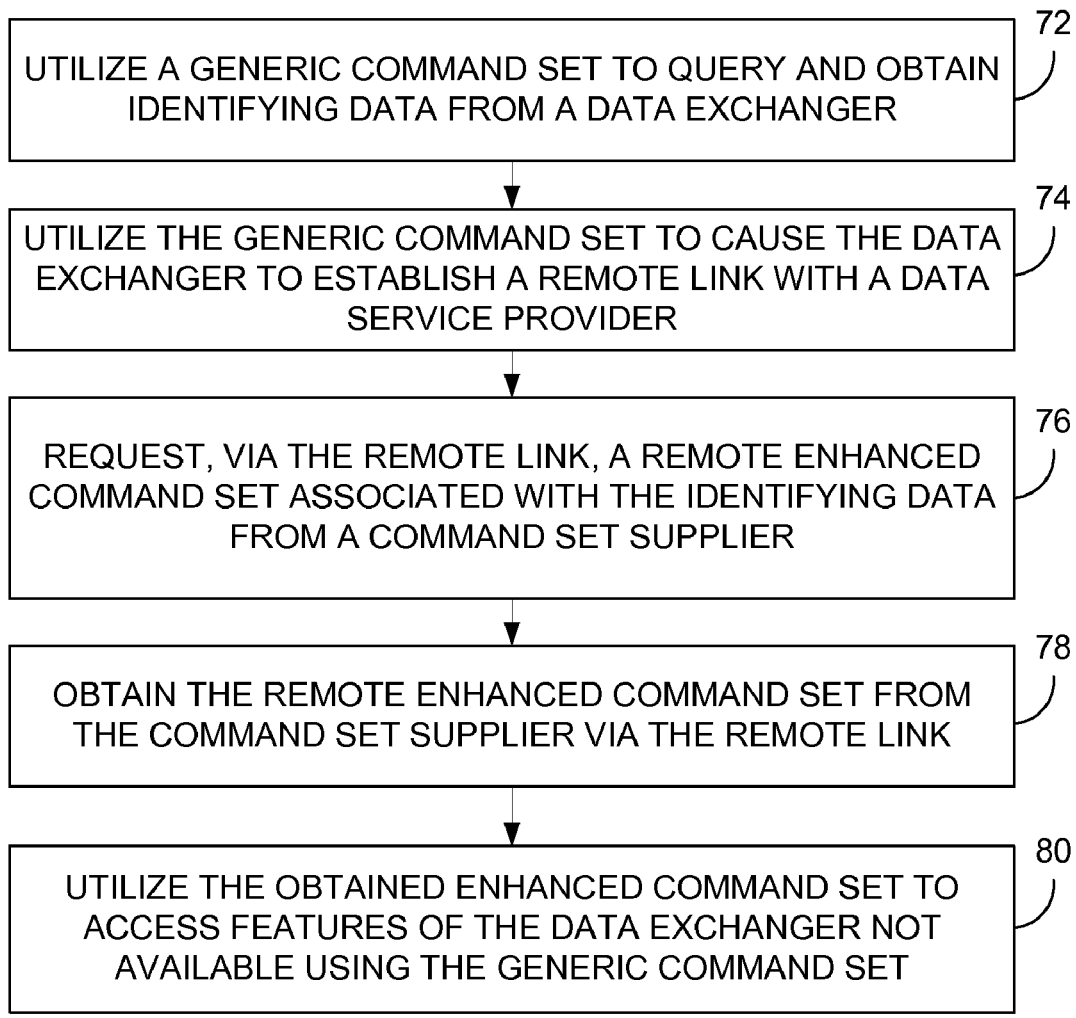
FIGS. 6-7 are exemplary flow diagrams illustrating steps taken in performance of various embodiments of the present invention.
Figure 7:
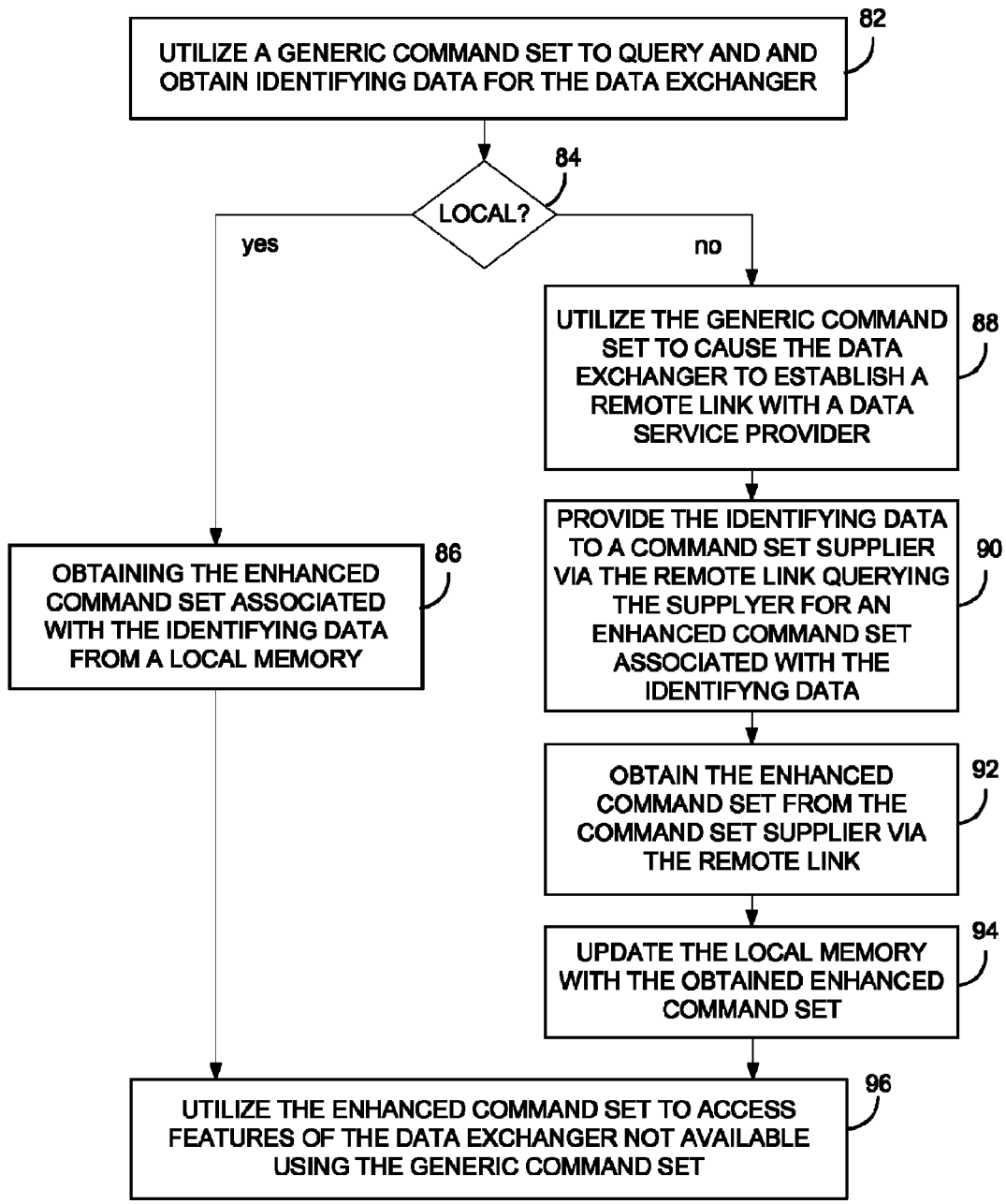

Operation:

The operation of embodiments of the present invention will now be described with reference to FIGS. 6-7. FIG. 6 is an exemplary flow diagram that depicts actions taken to access a remote enhanced command set. FIG. 7 is an exemplary flow diagram that depicts actions to selectively obtain, if available, a local enhanced command set and, if not available, a remote enhanced command set.

Starting with FIG. 6, a generic command set is utilized to query and obtain identifying data from a data exchanger (step 72). The generic command set is utilized to cause the data exchanger to establish a remote link with a corresponding data service provider (step 74). In the Example of FIGS. 2-5, connector 38 may accomplish steps 72 and 74 by selecting appropriate commands from generic command set 48 and communicating those commands to a data exchanger coupled to a selected data exchanger interface 32.

A request is made, via the remote link established in step 74, for a remote enhanced command set associated with the identifying data from command set provider (step 76). In the Example of FIGS. 2-5, connector 38 may accomplish step 76 by communicating the request via the remote link to the command set provider. That request would include the identifying data. The command set provider would then locate and return an enhanced command set associated with that identifying data.

The remote enhanced command set requested in step 76 is obtained from the command set provider via the remote link (step 78). The obtained enhanced command set is then utilized to access features of the data exchanger that are not available using the generic command set (step 80). In the Example of FIGS. 2-5, connector 38 may accomplish steps 78 and 80. With respect to step 80, connector 38 may utilize the obtained enhanced command set to interact with the data exchanger to achieve any of a number of goals. One goal may be to cause the data exchanger to obtain and install a firmware update. As noted, identifying data may include a current firmware version allowing data exchanger to identify, via the remote link, the availability of an update to the current firmware version. If available, the firmware update can be obtained and installed. Another goal may be to obtain current state information for the data exchanger. Such information may include data identifying a signal strength of a remote link as well as data transfer rates with respect to that remote link. Many other goals may by accomplished using the enhanced command set.

Furthermore, connector 38 may store the remote enhanced command step obtained in step 78 in memory 46. At this point memory 46 is configured to provide a local enhanced command set associated with the identifying data obtained in step 72.

Moving to FIG. 7, a generic command set is utilized to query and obtain identifying data from a data exchanger (step 82). In the Example of FIGS. 2-5, connector 38 may accomplish steps 82 by selecting an appropriate command from generic command set 48 and communicating that command to a data exchanger coupled to a selected data exchanger interface 32.

It is determined if a local enhanced command set is available (step 84) Continuing with the example of FIGS. 2-5, connector 38 can accomplish step 84 by accessing enhanced command sets 50 of memory 46. Connector 38 could then determine the existence of an enhanced command set associated with the identifying data obtained in step 82. If a local enhanced command exists, the process continues with step 86. If not, the process jumps to step 88.

Assuming that a local enhanced command set exists, the local enhanced command associated with the identifying data is obtained from a local memory. As used herein, the term local is used only to refer to a memory that can be accessed by a router device without the need for a remote link. In the example of FIGS. 2-5, such a local memory may be integral to the router device 10. In other examples, the local memory my be provided by a client device or a drive directly coupled to a local port of the router device 10.

If a local enhanced command set is determined not to be available in step 84, the generic command set is utilized to cause the data exchanger to establish a remote link with a corresponding data service provider (step 88). A request is made, via the remote link established in step 74, for a remote enhanced command set associated with the identifying data from command set provider (step 90). In the Example of FIGS. 2-5, connector 38 may accomplish step 90 by communicating the request via the remote link to the command set provider. That request would include the identifying data. The command set provider would then locate and return an enhanced command set associated with that identifying data.

The remote enhanced command set requested in step 90 is obtained from the command set provider via the remote link (step 92). The local memory is then updated with the enhanced command set obtained in step 92 (step 94). Following step 94 local memory includes a local enhanced command set associated with the identifying data obtained in step 82.

The enhanced command set in step 86 or in step 92 is then utilized to access features of the data exchanger that are not available using the generic command set (step 96). In the Example of FIGS. 2-5, connector 38 may accomplish steps 96 by utilizing the obtained enhanced command set to interact with the data exchanger to achieve any of a number of goals. One goal may be to cause the data exchanger to obtain and install a firmware update. As noted, identifying data may include a current firmware version allowing data exchanger to identify, via the remote link, the availability of an update to the current firmware version. If available, the firmware update can be obtained and installed. Another goal may be to obtain current state information for the data exchanger. Such information may include data identifying a signal strength of a remote link as well as data transfer rates with respect to that remote link. Many other goals may by accomplished using the enhanced command set.

CONCLUSION

The schematic diagram of FIG. 1 illustrates an exemplary environment in which embodiments of the present invention may be implemented. Implementation, however, is not limited to this environment. The diagrams of FIGS. 2-5 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may also represent in whole or in part a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention.

What is claimed is:

1. A method for accessing an enhanced command set, comprising:
    utilizing a generic command set to obtain identifying data from a data exchanger in communication with a router device;
    utilizing the generic command set to cause the data exchanger to establish a remote link between with a data service provider;
    obtaining, via the established remote link, a remote enhanced command set associated with the identifying data; and
    utilizing the obtained enhanced command set to access a feature of the data exchanger not available utilizing the generic command set.

2. The method of claim 1, wherein obtaining comprises communicating the identifying data via the remote link to a command set provider, requesting an enhanced command set associated with the identifying data.

3. The method of claim 1, wherein utilizing the enhanced command set comprises utilizing the enhanced command set to cause the data exchanger to obtain, via the remote link, and install a firmware upgrade.

4. The method of claim 3, wherein the identifying data includes data identifying a current firmware version for the data exchanger and wherein utilizing the enhanced command set to cause the data exchanger to obtain, via the remote link, and install a firmware update comprises utilizing the enhanced command set to cause the data exchanger to obtain, via the remote link, and install a firmware upgrade upon a determination of the existence of an update to the current firmware version.

5. The method of claim 1, wherein utilizing the enhanced command set comprises utilizing the enhanced command set to query the data exchanger for state information that includes one or both of a signal strength and a transfer rate.

6. The method of claim 1, comprising updating a local memory with the obtained enhanced command set enabling the local memory to provide a local enhanced command set associated with the identifying data.

7. The method of claim 1:
further comprising utilizing the identifying data to determine availability of a local enhanced command set associated with the identifying data and, if available, obtaining the local enhanced command set; and
wherein obtaining, via the established remote link, a remote enhanced command set associated with the identifying data comprises obtaining, via the established remote link, a remote enhanced command set associated with the identifying data only if the local enhanced command set is determined not to be available.

8. A computer readable medium having instructions that when executed by a router device cause the router device to perform a method that includes:
utilizing a generic command set to obtain identifying data from a data exchanger in communication with a router device;
utilizing the generic command set to cause the data exchanger to establish a remote link between with a data service provider;
obtaining, via the established remote link, a remote enhanced command set associated with the identifying data; and
utilizing the obtained enhanced command set to access a feature of the data exchanger not available utilizing the generic command set.

9. The method of claim 8, wherein obtaining comprises communicating the identifying data via the remote link to a command set provider, requesting an enhanced command set associated with the identifying data.

10. The medium of claim 8, wherein utilizing the enhanced command set comprises utilizing the enhanced command set to cause the data exchanger to obtain, via the remote link, and install a firmware upgrade.

11. The medium of claim 10, wherein the identifying data includes data identifying a current firmware version for the data exchanger and wherein utilizing the enhanced command set to cause the data exchanger to obtain, via the remote link, and install a firmware update comprises utilizing the enhanced command set to cause the data exchanger to obtain, via the remote link, and install a firmware upgrade upon a determination of the existence of an update to the current firmware version.

12. The medium of claim 8, wherein utilizing the enhanced command set comprises utilizing the enhanced command set to query the data exchanger for state information that includes one or both of a signal strength and a transfer rate.

13. The medium of claim 8, wherein:
The method includes utilizing the identifying data to determine availability of a local enhanced command set associated with the identifying data and, if available, obtaining the local enhanced command set; and
wherein obtaining, via the established remote link, a remote enhanced command set associated with the identifying data comprises obtaining, via the established remote link, a remote enhanced command set associated with the identifying data only if the local enhanced command set is determined not to be available.

14. A router device, comprising a data exchanger interface, a router, and a connector, wherein:
the plurality of data exchanger interfaces is configured to provide an interface between the router and a data exchanger coupled to that data exchanger interface;
the router is configured to route data communications between a local area network and the wide area network via a remote link established by the data exchanger coupled to the data exchanger interface; and
the connector is configured to:
utilize a generic command set to obtain identifying data from the data exchanger coupled to the data exchanger interface;
utilize the generic command set to cause the data exchanger to establish a remote link between with a data service provider;
obtain, via the established remote link, a remote enhanced command set associated with the identifying data; and
utilize the obtained enhanced command set to access a feature of the data exchanger not available utilizing the generic command set.

15. The router device of claim 14, wherein the connector is configured to obtain the remote enhanced command set by communicating the identifying data via the remote link to a command set provider, requesting an enhanced command set associated with the identifying data.

16. The router device of claim 14, wherein the connector is configured to utilize the enhanced command set to cause the data exchanger to obtain, via the remote link, and install a firmware upgrade.

17. The router device of claim 16, wherein the identifying data includes data identifying a current firmware version for the data exchanger and wherein the connector is configured to utilize the enhanced command set to cause the data exchanger to obtain, via the remote link, and install a firmware update upon a determination of the existence of an update to the current firmware version.

18. The router device of claim 14, wherein the connector is configured to utilize the enhanced command set to query the data exchanger for state information that includes one or both of a signal strength and a transfer rate.

19. The router device of claim 14, wherein the connector is configured to update a local memory with the obtained enhanced command set enabling the local memory to provide a local enhanced command set associated with the identifying data.

20. The router device of claim 14:
wherein the connector is configured to determine availability of a local enhanced command set associated with the identifying data and, if available, obtain the local enhanced command set; and
wherein the connector is configured to obtain a remote enhanced command set associated with the identifying data only if the local enhanced command set is determined not to be available.

* * * * *